United States Patent
Zhang (10) Patent No.: US 11,574,009 B2
(45) Date of Patent: Feb. 7, 2023

(54) METHOD, APPARATUS AND COMPUTER DEVICE FOR SEARCHING AUDIO, AND STORAGE MEDIUM

(71) Applicant: GUANGZHOU KUGOU COMPUTER TECHNOLOGY CO., LTD., Guangzhou (CN)

(72) Inventor: Chaogang Zhang, Guangzhou (CN)

(73) Assignee: GUANGZHOU KUGOU COMPUTER TECHNOLOGY CO., LTD., Guangzhou (CN)

(*) Notice: Subject to any disclaimer, the term of this patent is extended or adjusted under 35 U.S.C. 154(b) by 175 days.

(21) Appl. No.: 16/617,936

(22) PCT Filed: Nov. 26, 2018

(86) PCT No.: PCT/CN2018/117509
§ 371 (c)(1),
(2) Date: Nov. 27, 2019

(87) PCT Pub. No.: WO2019/128593
PCT Pub. Date: Jul. 4, 2019

(65) Prior Publication Data
US 2020/0104320 A1    Apr. 2, 2020

(30) Foreign Application Priority Data
Dec. 29, 2017 (CN) .......................... 201711474934.9

(51) Int. Cl.
*G06F 16/68* (2019.01)
*G06F 16/583* (2019.01)
(Continued)

(52) U.S. Cl.
CPC ........ *G06F 16/686* (2019.01); *G06F 3/04883* (2013.01); *G06F 16/583* (2019.01);
(Continued)

(58) Field of Classification Search
CPC .... G06F 16/686; G06F 16/583; G06F 16/685; G06F 3/04883; G06F 3/0482; G10L 25/51
(Continued)

(56) References Cited

U.S. PATENT DOCUMENTS 6,188,010 B1* 2/2001 Iwamura ............... G10H 1/0008
84/477 R
2007/0143499 A1* 6/2007 Chang .................... G06Q 10/10
700/100
(Continued)

FOREIGN PATENT DOCUMENTS

CN    103177722 A    6/2013
CN    103685931 A    3/2014
(Continued)

OTHER PUBLICATIONS

S. Xu, S. Chen, K. Y. Yip, F. C. M. Lau and X. Qin, "A Two-Stage Audio Retrieval Method for Searching Unannotated Audio Clips," 2008 Tenth IEEE International Symposium on Multimedia, 2008, pp. 334-339, doi: 10.1109/ISM.2008.46. (Year: 2008).*
(Continued)

*Primary Examiner* — Hosain T Alam
*Assistant Examiner* — Robert F May
(74) *Attorney, Agent, or Firm* — Ice Miller LLP (57) ABSTRACT

The present disclosure relates to a method for searching an audio, pertaining to the technical field of electronics. The method includes: detecting a predetermined trigger event in response to receiving a trigger instruction for searching an audio; recording a time point when a detected trigger event occurs each time upon detecting the predetermined trigger event once until a predetermined end event is detected, and acquiring recorded time points to obtain a time point sequence; selecting a target reference time sequence match-
(Continued)

ing the time point sequence from pre-stored reference time sequences; and determining target audio data corresponding to the target reference time sequence based on a pre-stored corresponding relationship between audio data and the reference time sequence.

15 Claims, 4 Drawing Sheets

(51) Int. Cl.
*G06F 16/683* (2019.01)
*G06F 3/04883* (2022.01)
*G10L 25/51* (2013.01)
*G06F 3/0482* (2013.01)

(52) U.S. Cl.
CPC ............ *G06F 16/685* (2019.01); *G10L 25/51* (2013.01); *G06F 3/0482* (2013.01)

(58) Field of Classification Search
USPC ........................................................ 707/769
See application file for complete search history.

(56) References Cited

U.S. PATENT DOCUMENTS

| | | | | |
|---|---|---|---|---|
| 2007/0201558 | A1* | 8/2007 | Xu | G06V 20/49 348/700 |
| 2007/0254271 | A1* | 11/2007 | Burlik | A63B 71/0622 434/247 |
| 2009/0030680 | A1 | 1/2009 | Mamou | |
| 2009/0193099 | A1* | 7/2009 | Partridge | H04W 4/029 709/219 |
| 2011/0295843 | A1* | 12/2011 | Ingrassia, Jr. | G06F 16/4387 707/723 |
| 2013/0297599 | A1* | 11/2013 | Henshall | G06F 16/683 707/736 |
| 2015/0093729 | A1* | 4/2015 | Plans | G09B 5/00 434/262 |
| 2015/0294096 | A1* | 10/2015 | Grigg | H04L 63/08 726/5 |
| 2016/0088031 | A1* | 3/2016 | Kumar | H04L 65/403 709/204 |
| 2017/0162205 | A1 | 6/2017 | Melvin et al. | |
| 2017/0300531 | A1 | 10/2017 | Poovananathan et al. | |
| 2018/0210952 | A1* | 7/2018 | Takano | G06F 16/61 |

FOREIGN PATENT DOCUMENTS

| | | |
|---|---|---|
| CN | 105808996 A | 7/2016 |
| CN | 106790997 A | 5/2017 |
| CN | 107229629 A | 10/2017 |
| CN | 108090210 A | 5/2018 |
| JP | 2008234453 A | 10/2008 |
| WO | WO0111496 A2 | 2/2001 |
| WO | WO2008106666 A2 | 9/2008 |
| WO | WO2017056982 A1 | 4/2017 |

OTHER PUBLICATIONS

Lin et al., "Automatic Music Video Generation Based on Emotion-Oriented Pseudo Song Prediction and Matching", Oct. 2016, MM '16: Proceedings of the 24th ACM international conference on Multimedia pp. 372-376 (Year: 2016).*
International search report of PCT application No. PCT/CN2018/117509 dated Mar. 6, 2019.
First office action of Chinese application No. 201711474934.9 dated Dec. 12, 2019.
Second office action of Chinese application No. 201711474934.9 dated Apr. 13, 2020.
Extended European search report of counterpart EP application No. 18897526.2 dated Apr. 24, 2020.
Hung-Che Shen et al; "Whistle for music: using melody transcription and approximate string matching for content-based query over a MIDI database", Multimedia Tools and Applications, Kluwer Academic Publishers, BO, vol. 35, No. 3, May 2, 2007 (May 2, 2007), pp. 259-283, abstract, p. 265, line 10-line 19.
Jacob Otto Wobbrock; "TapSongs", Proceedings of the 22nd Annual ACM Symposium on User Interface Software and Technology: Victoria, British Columbia, Oct. 4-7, 2009, ACM, New York, NY, Oct. 4, 2009 (Oct. 4, 2009), pp. 93-96, abstract, p. 93, right-hand column, line 11-line 24.
Communication pursuant to Article 94(3) EPC of counterpart EP application No. 18897526.2 dated Jan. 14, 2022.
Kovacsl et al., A Folk Song Retrieval System with a Gesture-Based Interface; IEEE Multimedia, IEEE Service Center, New York, NY, US, vol. 16, No. 3, Jul. 1, 2009, pp. 48-59, XP011275924, ISSN: 1070-986X, DOI: 10.1109/MMUL.2009.41.

* cited by examiner

METHOD, APPARATUS AND COMPUTER DEVICE FOR SEARCHING AUDIO, AND STORAGE MEDIUM

This disclosure is a national phase application of PCT international application No. PCT/CN2018/117509, filed on Nov. 26, 2018, which claims priority to Chinese Patent Application No. 201711474934.9, filed on Dec. 29, 2017 and entitled "METHOD AND APPARATUS FOR SEARCHING AUDIO", the entire contents of which are incorporated herein by reference.

TECHNICAL FIELD

The present disclosure relates to the field of electronics technologies, and in particular, relates to a method, an apparatus and a computer device for searching an audio, and a storage medium.

BACKGROUND

In the related art, a user may enjoy a variety of audios by using a music application installed in a mobile phone. The user may search corresponding audio data based on song information, such as the title, lyrics and the like of the song in an music application, and play the audio data.

SUMMARY

The present disclosure provides following technical solutions.

According to a first aspect of the embodiments of the present disclosure, there is provided a method for searching an audio performed by a computer device. The method comprises:

detecting a predetermined trigger event in response to receiving a trigger instruction for searching an audio;

recording a time point when a detected trigger event occurs each time upon detecting the predetermined trigger event once; acquiring recorded time points to when a predetermined end event is detected obtain a time point sequence;

selecting a target reference time sequence matching the time point sequence from pre-stored reference time sequences, wherein the reference time sequence is a sequence formed of time information of a plurality of contiguous audio units in audio data; and determining target audio data corresponding to the target reference time sequence based on a pre-stored corresponding relationship between audio data and the reference time sequence.

Optionally, the selecting a target reference time sequence matching the time point sequence from pre-stored reference time sequences comprises:

determining a difference degree between each pre-stored reference time sequence and the time point sequence respectively, and selecting a reference time sequence which has a minimum difference degree from the time point sequence as the target reference time sequence.

Optionally, the determining a difference degree between each pre-stored reference time sequence and the time point sequence comprises:

calculating an edit distance between each pre-stored reference time sequence and the time point sequence; and taking the edit distance between each pre-stored reference time sequence and the time point sequence as a difference degree between each pre-stored reference time sequence and the time point sequence.

Optionally, the detecting a predetermined trigger event comprises any one of:

detecting that a terminal is shaken;

detecting a touch signal in a predetermined region of a touch screen of a terminal;

acquiring a plurality of frames of images by an image capturing component of a terminal, and detecting an image of a predetermined user action in the plurality of frames of images; and acquiring ambient audio data by an audio capturing component of a terminal, and identifying predetermined audio feature information in the ambient audio data.

Optionally, the audio unit is an audio segment corresponding to a note.

Optionally, the audio unit is an audio segment corresponding to a word in lyrics corresponding to the audio data.

Optionally, the time information comprises a start time point of an audio unit.

Optionally, the time information comprises a time duration of an audio unit.

Optionally, the selecting a target reference time sequence matching the time point sequence from pre-stored reference time sequences comprises:

determining, based on the time point sequence, a time difference between each two adjacent time points in the time point sequence to obtain a time difference sequence; and selecting a target reference time sequence matching the time different sequence from the pre-stored reference time sequences.

According to a second aspect of the embodiments of the present disclosure, there is provided computer device, comprising: a processor; and a memory configured to store instructions executable by the processor; wherein the processor is configured to:

detect a predetermined trigger event in response to receiving a trigger instruction for searching an audio;

record a time point when a detected trigger event occurs each time upon detecting the predetermined trigger event once; acquire recorded time points when a predetermined end event is detected to obtain a time point sequence;

select a target reference time sequence matching the time point sequence from pre-stored reference time sequences, wherein the reference time sequence is a sequence formed of time information of a plurality of contiguous audio units in audio data; and determine target audio data corresponding to the target reference time sequence based on a pre-stored corresponding relationship between audio data and the reference time sequence.

Optionally, the processor is further configured to:

determine a difference degree between each pre-stored reference time sequence and the time point sequence respectively, and select a reference time sequence which has a minimum difference degree from the time point sequence as the target reference time sequence.

Optionally, the processor is further configured to:

calculate an edit distance between each pre-stored reference time sequence and the time point sequence; and take the edit distance between each pre-stored reference time sequence and the time point sequence as a difference degree between each pre-stored reference time sequence and the time point sequence.

Optionally, the processor is further configured to perform any one of following operations:

detect that a terminal is shaken;

detecting a touch signal in a predetermined region of a touch screen of a terminal;

acquiring a plurality of frames of images by an image capturing component of a terminal, and detecting an image of a predetermined user action in the plurality of frames of images; and acquiring ambient audio data by an audio capturing component of a terminal, and identifying predetermined audio feature information in the ambient audio data.

Optionally, the audio unit is an audio segment corresponding to a note.

Optionally, the audio unit is an audio segment corresponding to a word in lyrics corresponding to the audio data.

Optionally, the time information comprises a start time point of the audio unit.

Optionally, the time information comprises a time duration of the audio unit.

Optionally, the processor is further configured to:

determine, based on the time point sequence, a time difference between each two adjacent time points in the time point sequence to obtain a time difference sequence; and select a target reference time sequence matching the time difference sequence from the pre-stored reference time sequences.

According to a third aspect of the embodiments of the present disclosure, there is provided a computer device, comprising a processor and a memory; wherein the memory stores at least one instruction, at least one program, a code set or an instruction set, the at least one instruction, the at least one program, the code set or the instruction set being executed and loaded by the processor to perform the method for searching an audio described above.

According to a fourth aspect of the embodiments of the present disclosure, there is provided a computer-readable storage medium, wherein the computer-readable storage medium stores at least one instruction, at least one program, a code set or an instruction set, the at least one instruction, the at least one program, the code set or the instruction set being executed and loaded by a processor to perform the method for searching an audio described above.

It is to be understood that both the foregoing general description and the following detailed description are exemplary and explanatory only and are not intended to limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

Specific embodiments of the present disclosure have been illustrated by the accompanying drawings, and detailed descriptions will be given hereinafter. These drawings and textual descriptions are not intended to limit the scope of the concept of the present disclosure, but to illustrate the concept of the present disclosure for a person skilled in the art by reference to the specific embodiments.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the disclosure as recited in the appended claims.

In the related art, in some cases, if the user forgets the title or lyrics of the song, the user fails to search the corresponding audio data.

Embodiments of the present disclosure provide a method for searching an audio. The method may be performed by a computer device. For example, in a possible implementation, the above method may be performed by a terminal.

The terminal may be a mobile phone, a tablet computer, a desktop computer, a laptop computer or the like.

The terminal may include a processor, a memory, etc. The processor may be a central processing unit (CPU) or the like. In the embodiment of the present disclosure, the processor may be configured to record a time point when a trigger event occurs each time upon detecting a predetermined trigger event once until a predetermined end event is detected, and acquire recorded time points to obtain a time point sequence. The memory may be a random access memory (RAM), a flash or the like, and may be configured to store received data, data desired in the processing, data generated in the processing and the like. For example, in the embodiment of the present disclosure, the memory may store reference time sequences, etc.

The terminal may further include a transceiver, an input component, a display component, an audio output component and the like. The transceiver may be configured to implement data transmission with a server. For example, the transceiver may receive a reference time sequence transmitted by the server. The transceiver may include a Bluetooth component, a wireless fidelity (WiFi) component, an antenna, a matching circuit, a modem and the like. The input component may be a touch screen, a keyboard or keypad, a mouse or the like. The audio output component may be a speaker, an earphone or the like.

The terminal may be installed with system programs or applications. During the use of the terminal by a user, based on different demands of the user, various applications may be used. In the embodiment of the present disclosure, an application having a music play function may also be installed in the terminal.

Alternatively, in another possible implementation, the method for searching an audio in the embodiment of the present disclosure may also be performed by interaction between a terminal and other computer devices, for example, by interaction between a terminal and a server. The above terminal and server are connected by a communication network. Optionally, the communication network may be a wired or wireless network.

The above server may be one server or a plurality of servers, or a virtualization platform, or a cloud computer service center.

The above server may be a server with backend support provided by an application installed in a terminal (for example, the application with the function of music play).

Figure 1:
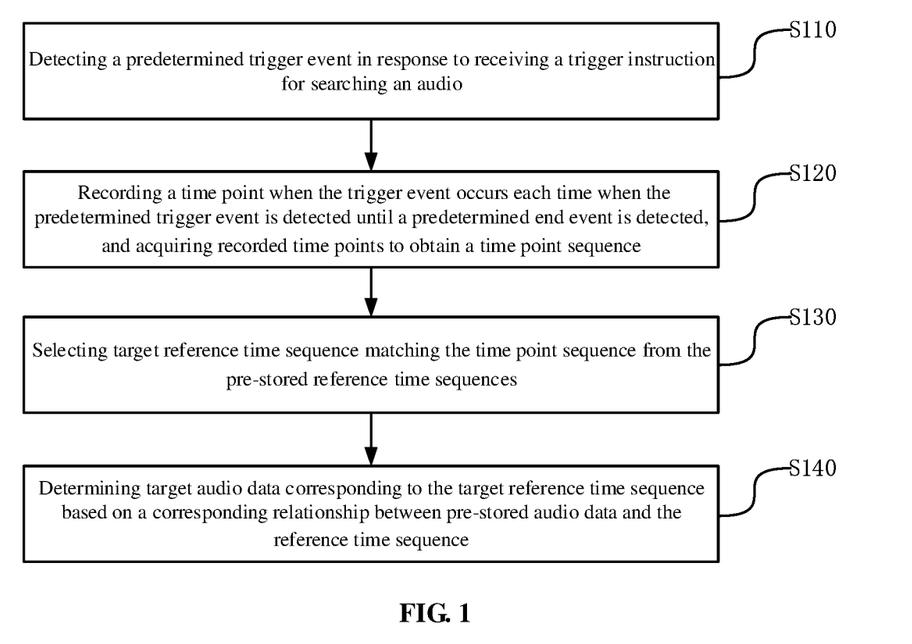
FIG. 1 is a schematic flowchart of a method for searching an audio according to an exemplary embodiment of the present disclosure.

An exemplary embodiment of the present disclosure provides a method for searching an audio. The method is performed by a terminal. For example, by taking an example where the method is performed by a terminal based on an installed application with the function of music play, as illustrated in FIG. 1, a processing flow of the method may include the following steps.

In step S110, a predetermined trigger event is detected in response to receiving a trigger instruction for searching an audio.

Figure 2:
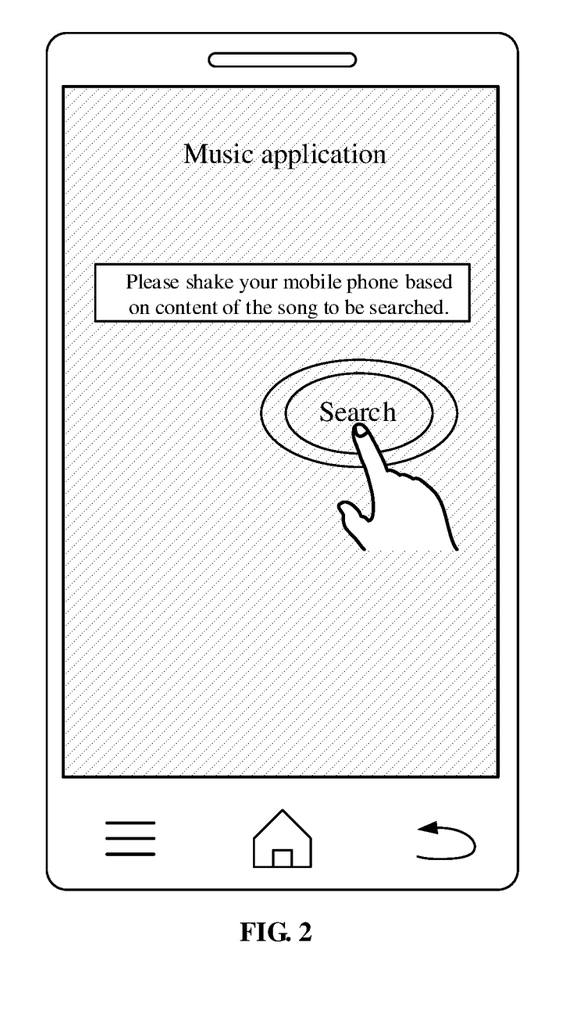
FIG. 2 is a schematic diagram of a search interface of a music application according to an exemplary embodiment of the present disclosure.

During the implementation, when a user opens a music application, the user may search desired audio data by inputting a time sequence to a terminal via a search interface. As illustrated in FIG. 2, the search interface of the terminal may display "please shake your mobile phone based on content of the song to be searched". When the terminal detects that the user touches the "search" key, the terminal may start to detect the predetermined trigger event. Here, the above search interface may be a search interface in an application with the function of music play.

Optionally, the detecting a predetermined trigger event may include any one of the operations:

(1) detecting that a terminal is shaken;
(2) detecting a touch signal in a predetermined region of a touch screen of the terminal;
(3) acquiring a plurality of frames of images by an image capturing component of the terminal, and detecting an image of a predetermined user action in the plurality of frames of images; and
(4) acquiring ambient audio data by an audio capturing component of the terminal, and identifying predetermined audio feature information in the ambient audio data.

During the implementation, with respect to the situation of detection of the predetermined trigger event in operation 2), detection of a touch signal may be detection that the user performs an operation of tapping in the predetermined region of the touch screen, that is, the terminal may detect the touch signal when the user performs the tap operation. With respect to the situation of detection of the predetermined trigger event in operation 3), the predetermined user action may be shaking head, clamping hands, swinging hands, jumping, stamping or the like. Whether the user has done the above predetermined user actions may be detected by identifying a plurality of frames of images by the terminal. With respect to the situation of detection of the predetermined trigger event in operation 4), the predetermined audio feature information may be audio features extracted from the acquired audio during the process of humming by the user, or audio features of playing the rhythm, etc. In addition to the above predetermined trigger events, if the terminal is a personal computer (PC) and other computer devices with an external keyboard or equipped with a keyboard, the trigger event may also be a keyboard or keypad stroke event.

In step S120, a time point when the trigger event occurs is recorded each time when the predetermined trigger event is detected until a predetermined end event is detected, and recorded time points are acquired to obtain a time point sequence.

Here, upon detecting the predetermined trigger event once, the terminal records the point when the detected trigger event occurs. When the terminal detects a predetermined end event, the terminal may terminate detecting the above predetermined end event, and acquire time points recorded during the process of detecting the predetermined end event, to obtain the above time sequence.

During the implementation, each time when the predetermined trigger event is detected, the terminal may record the time point when the trigger event occurs. For example, each time when it is detected that the terminal is shaken, a time point when the terminal is shaken is recorded, or a time point when the terminal is shaken by a predetermined angle is recorded. Until the predetermined end event is detected, the time points recorded are acquired, and these time points are combined to obtain the time point sequence. The predetermined end event may mean that within a predetermined time period, for example, a default detection time period of 30 s, timing is started upon receipt of the trigger instruction for searching the audio, and 30 s later, detection of the predetermined trigger event is stopped. Alternatively, the predetermined end event may indicate that it is detected that an end trigger instruction is input. For example, an input end key may be configured in the search interface. When the user touches the key, the terminal may detect that the end trigger instruction is input, and stop detecting the predetermined trigger event. Alternatively, each time after the predetermined trigger even is detected, countdown is started by the terminal, and after the countdown is expired, if a next occurrence of the predetermined trigger event is not detected, it's determined that the predetermined end event is detected and detection of the predetermined trigger even is stopped.

Finally, the terminal acquires the time points recorded to obtain the time point sequence. For example, the terminal detects that the predetermined trigger event occurs for 5 times, and acquires the time points recorded to obtain the time point sequence of: 00'20, 00'54, 00'84, 01'12, 01'37. Nevertheless, in practice, the time point sequence includes more or less data than in the example. Herein, the implementation manner of this embodiment is described exemplarily.

In step 130, a target reference time sequence matching the time point sequence is selected from the pre-stored reference time sequences.

The reference time sequence is a sequence formed of time information of a plurality of contiguous audio units included in the audio data.

During the implementation, the audio unit may be an audio segment corresponding to a note, or the audio unit may be an audio segment corresponding to a word in lyrics corresponding to the audio data. For example, a song may include a plurality of sentences, and each sentence may include a plurality of notes or lyrics. The plurality of lyrics may include a plurality of characters. Therefore, audio data of a song may be segmented based on each sentence. Each sentence may include a plurality of contiguous audio units. Alternatively, audio data of a song may be segmented based on notes.

The time information may include a start time point of the audio unit or a time duration of the audio unit. The time information of the audio unit may be a start time point of the audio segment corresponding to each note. Since the audio of the nodes may last for a period of time, the start time point may be selected and recorded when time information is acquired. The time information of the audio unit may also be a start time point of the audio segment corresponding to the words in the lyrics corresponding to the audio data. Likewise, since the audio of the words in the lyrics may last for a period of time, the start time point may be selected and recorded when time information is acquired. Alternatively, the start time point is not recorded, but a time difference between each two adjacent audio units, that is, a time duration of the audio unit, may be recorded when time information is acquired.

For better matching with the time point sequence input by the user, the reference time sequences in a database may be appropriately expanded. That is, each song may be segmented in different ways, and the time information of different types of audio units may be recorded. Different types of audio units include audio segments corresponding to the notes, or audio segments corresponding to the words in the lyrics corresponding to the audio data.

The user may generally select to input the time point sequence corresponding to the climactic or verse part of the song. Therefore, for reduction of the calculation load, the reference time sequences in the database may be appropriately reduced. For example, time information of a plurality of contiguous audio units corresponding to a climactic or verse part of each song may be only recorded, but time information of a plurality of contiguous audio units corresponding to an intro or chorus part of each song may be not recorded.

Optionally, when the time information is a time duration of the audio unit, step S130 may include: determining, based on the time point sequence, a time difference between each two adjacent time points in the time point sequence to obtain a time difference sequence; and selecting a target reference time sequence matching with the time different sequence from the pre-stored reference time sequences.

During the implementation, for the convenience of calculation, the terminal may convert the time point sequence input by the user to a time difference sequence for subsequent processing. If the reference time sequences pre-stored in the database are the time durations of the audio units, the reference time sequences may be directly used. If the reference time sequences pre-stored in the database are the start time points of the audio units, these start time points may be converted to time differences for subsequent processing. Specifically, the time difference between each two adjacent time points in the time point sequence may be determined based on the time point sequence, to obtain the time difference sequence. Afterwards, the time difference sequence is matched with a reference time difference sequence. The time difference sequence input by the user and converted to the time differences may be marked as $\hat{X}$, and the reference time difference sequence may be marked as $\hat{Y}$. $\hat{X}$ and $\hat{Y}$ may be represented by the following expressions:

$$\hat{X} = [\hat{x}_1 \hat{x}_2 \ldots \hat{x}_{n-2} \hat{x}_{n-1}] \quad \text{(Expression 1)}$$

$$\hat{Y} = [\hat{y}_1 \hat{y}_2 \ldots \hat{y}_{m-2} \hat{y}_{m-1}] \quad \text{(Expression 2)}$$

Optionally, step S130 may include: determining a difference degree between each pre-stored reference time sequence and the time point sequence, and selecting a target reference time sequence which has a minimum difference degree from the time point sequence. That is, a reference time sequence which has a minimum difference degree from the time point sequence is selected at the target reference time sequence.

During the implementation, a difference degree between $\hat{X}$ and each $\hat{Y}$ may be calculated, and a target $\hat{Y}_{min}$ which has a minimum difference degree from the time point sequence may be selected. Assuming that the difference degree between $\hat{X}$ and an $i^{th}$ $\hat{Y}$ is marked as distance($\hat{X}, \hat{Y}_i$), then a target reference time sequence which has a minimum difference degree from the time point sequence may be represented by the following expression:

$$k = \arg\min(\text{distance}(\hat{X}, \hat{Y}_i)), \ 0 \le i \le Q \quad \text{(Expression 3)}$$

In Expression 3, Q denotes the number of the reference time sequences.

Optionally, the step of determining a difference degree between each pre-stored reference time sequence and the time point sequence may include: calculating an edit distance between each pre-stored reference time sequence and the time point sequence as the difference degree. The edit distance between each pre-stored reference time sequence and the time point sequence is taken as the difference degree between each pre-stored reference time sequence and the time point sequence.

During the implementation, when i=0 or j=0, the following expression is tenable:

$$c[i][j] = 0 \quad \text{(Expression 4)}$$

When i>0 and j>0, the following expression is tenable:

$$c[i][j] = \min \begin{cases} c[i-1][j] + a \\ c[i-1][j-1] + \text{abs}(\hat{x}_i - \hat{y}_j) \\ c[i][j-1] + b \end{cases} \quad \text{(Expression 5)}$$

In Expression 5, abs( ) denotes an absolute value operator, a and b denote weight constants whose values may be empirically taken, and c[i][j] denotes an edit distance matrix which is an n×m matrix. An edit distance between $\hat{X}$ and the $i^{th}$ $\hat{Y}$ is as follows:

$$\text{distance}(\hat{X}, \hat{Y}_i) = \min(c[n][j]), \ 0 < j \le m \quad \text{(Expression 6)}$$

In Expression 6, n denotes the number of time differences included in $\hat{X}$, and m denotes the number of time differences included in the $i^{th}$ $\hat{Y}$.

Optionally, a cross-correlation between each pre-stored reference time sequence and the time point sequence may be calculated by a cross-correlation function as the difference degree between each pre-stored reference time sequence and the time point sequence.

During the implementation, the cross-correlation may be calculated by the cross-correlation function. A calculation formula is as follows:

$$c(n) = \sum_j x(j) y(j-n), \ 0 < j \le \min(n, m) \quad \text{(Expression 7)}$$

In this case, distance($\hat{X}, \hat{Y}_i$)=min(c(n)).

Optionally, the difference degree between each pre-stored reference time sequence and the time point sequence may also be calculated by the Earth Mover's Distance (EMD) algorithm.

In step S140, target audio data corresponding to the target reference time sequence is determined based on a pre-stored corresponding relationship between audio data and the reference time sequence.

During the implementation, when the time difference sequence input by the user successfully matches the target reference time difference sequence, it is considered that the song desired by the user is the target audio data corresponding to the target reference time difference sequence.

The embodiment of the present disclosure is described by taking an example in which the above steps are performed by a terminal. Optionally, the above steps may also be performed by interaction between a terminal and other computer device (for example, a server). For example, in a possible implementation, the terminal may perform step S110 to step S120 in the embodiment of the present disclosure. Then, the terminal provides the acquired time point sequence to the server, and the server performs step S130 to step S140 in the embodiment of the present disclosure. Optionally, after searching out the corresponding target audio data, the server feedbacks the search results to the terminal, such that the terminal may show and play the search results.

With the method according to this embodiment, a predetermined trigger event is detected in response to receiving a trigger instruction for searching an audio; a time point when the trigger event occurs is recorded each time when the predetermined trigger event is detected until a predetermined end event is detected, and recorded time points are acquired to obtain a time point sequence; a target reference time sequence matching the time point sequence is selected from pre-stored reference time sequences, wherein the reference time sequence is a sequence formed of time information of a plurality of contiguous audio units in audio data; and target audio data corresponding to the target reference time sequence is determined based on a pre-stored corresponding relationship between audio data and the reference time sequence. In this way, the user may input a time point sequence reflecting audio change characteristics based on an operation mode (for example, tapping the screen of the mobile phone) corresponding to the predetermined trigger event, and search the corresponding audio data based on the time point sequence, such that the audio data may be searched without the title of the song.

Figure 3:
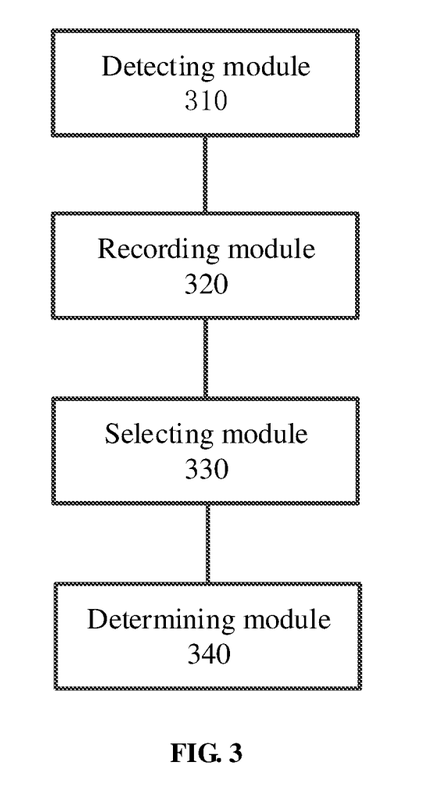
FIG. 3 is a schematic structural diagram of an apparatus for searching an audio according to an exemplary embodiment of the present disclosure.

Another exemplary embodiment of the present disclosure provides an apparatus for searching an audio. The apparatus may be implemented as all or part of a computer device through a hardware or a combination of a hardware and a software, to perform part or all of the steps in the embodiment illustrated in FIG. 2. Here, the above computer device may be individually implemented as a terminal, or the computer device may also be implemented as a combination of a terminal and a server. As illustrated in FIG. 3, the apparatus includes:

a detecting module 310, configured to detect a predetermined trigger event in response to receiving a trigger instruction for searching an audio;

a recording module 320, configured to record a time point when the detected trigger event occurs each time upon detecting the predetermined trigger event once until a predetermined end event is detected, and acquire recorded time points to obtain a time point sequence;

a selecting module 330, configured to select a target reference time sequence matching the time point sequence from pre-stored reference time sequences, wherein the reference time sequence is a sequence formed of time information of a plurality of contiguous audio units in audio data; and a determining module 340, configured to determine target audio data corresponding to the target reference time sequence based on a pre-stored corresponding relationship between audio data and the reference time sequence.

Optionally, the selecting module 330 is configured to:
determine a difference degree between each pre-stored reference time sequence and the time point sequence, and select a reference time sequence which has a minimum difference degree from the time point sequence as the target reference time sequence.

Optionally, the selecting module 330 is configured to:
calculate an edit distance between each pre-stored reference time sequence and the time point sequence; and take the edit distance between each pre-stored reference time sequence and the time point sequence as the difference degree between each pre-stored reference time sequence and the time point sequence.

Optionally, the detecting module 310 is configured to perform any one of operations of:
detecting that a terminal is shaken;
detecting a touch signal in a predetermined region of a touch screen of a terminal;
acquiring a plurality of frames of images by an image capturing component of a terminal, and detecting an image of a predetermined user action in the plurality of frames of images; and
acquiring ambient audio data by an audio capturing component of a terminal, and identifying predetermined audio feature information in the ambient audio data.

Optionally, the audio unit is an audio segment corresponding to a note, or the audio unit is an audio segment corresponding to a word in lyrics corresponding to the audio data.

Optionally, the time information includes a start time point of the audio unit or a time duration of the audio unit.

Optionally, the time information is a time duration of the audio unit, and the selecting module 330 includes:
a determining unit, configured to determine, based on the time point sequence, a time difference between each two adjacent time points in the time point sequence to obtain a time difference sequence; and
a selecting unit, configured to select a target reference time sequence matching with the time different sequence from the pre-stored reference time sequences.

With respect to the apparatus in the above embodiment, details about performing corresponding operations by different modules have been described in the method embodiment, which are not given herein any further.

In this way, the user may input a time point sequence reflecting audio change characteristics based on an operation mode (for example, tapping the screen of the mobile phone) corresponding to the predetermined trigger event, and search the corresponding audio data based on the time point sequence, such that the audio data may be searched without the title of the song.

It should be noted that, during audio searching by the apparatus for searching an audio according to the above embodiment, the apparatus is described by only using division of the above functional modules as examples. In practice, the functions may be assigned to different functional modules for implementation as required. To be specific, the internal structure of the apparatus is divided into different functional modules to implement all or part of the above-described functions. In addition, the apparatus for searching an article according to the above embodiment is based on the same inventive concept as the method for searching an audio according to the embodiment of the present disclosure. The specific implementation is elaborated in the method embodiment, which is not described herein any further.

Another exemplary embodiment of the present disclosure provides a computer device. The computer device may be individually implemented as a terminal, or the computer device may also be implemented as a combination of a terminal and a server. The computer device includes: a processor; and a memory configured to store instructions executable by the processor;

wherein the processor is configured to:

detect a predetermined trigger event in response to receiving a trigger instruction for searching an audio;

record a time point when a detected trigger event occurs each time upon detecting the predetermined trigger event once;

acquire recorded time points when a predetermined end event is detected to obtain a time point sequence;

select a target reference time sequence matching the time point sequence from pre-stored reference time sequences, wherein the reference time sequence is a sequence formed of time information of a plurality of contiguous audio units in audio data; and determine target audio data corresponding to the target reference time sequence based on a pre-stored corresponding relationship between audio data and the reference time sequence.

Optionally, the processor is further configured to:

determine a difference degree between each pre-stored reference time sequence and the time point sequence respectively; and select a reference time sequence which has a minimum difference degree from the time point sequence as the target reference time sequence.

Optionally, the processor is further configured to:

calculate an edit distance between each pre-stored reference time sequence and the time point sequence; and take the edit distance between each pre-stored reference time sequence and the time point sequence as a difference degree between each pre-stored reference time sequence and the time point sequence.

Optionally, the processor is further configured to perform any one of the following operations:

detecting that a terminal is shaken;

detecting a touch signal in a predetermined region of a touch screen of the terminal;

acquiring a plurality of frames of images by an image capturing component of the terminal, and detecting an image of a predetermined user action in the plurality of frames of images; and acquiring ambient audio data by an audio capturing component of the terminal, and identifying predetermined audio feature information in the ambient audio data.

Optionally, the audio unit is an audio segment corresponding to a note.

Optionally, the audio unit is an audio segment corresponding to a word in lyrics corresponding to the audio data.

Optionally, the time information includes a start time point of the audio unit.

Optionally, the time information includes a time duration of the audio unit

Optionally, the processor is further configured to:

determining, based on the time point sequence, a time difference between each two adjacent time points in the time point sequence to obtain a time difference sequence; and selecting a target reference time sequence matching the time different sequence from the pre-stored reference time sequences.

Figure 4:
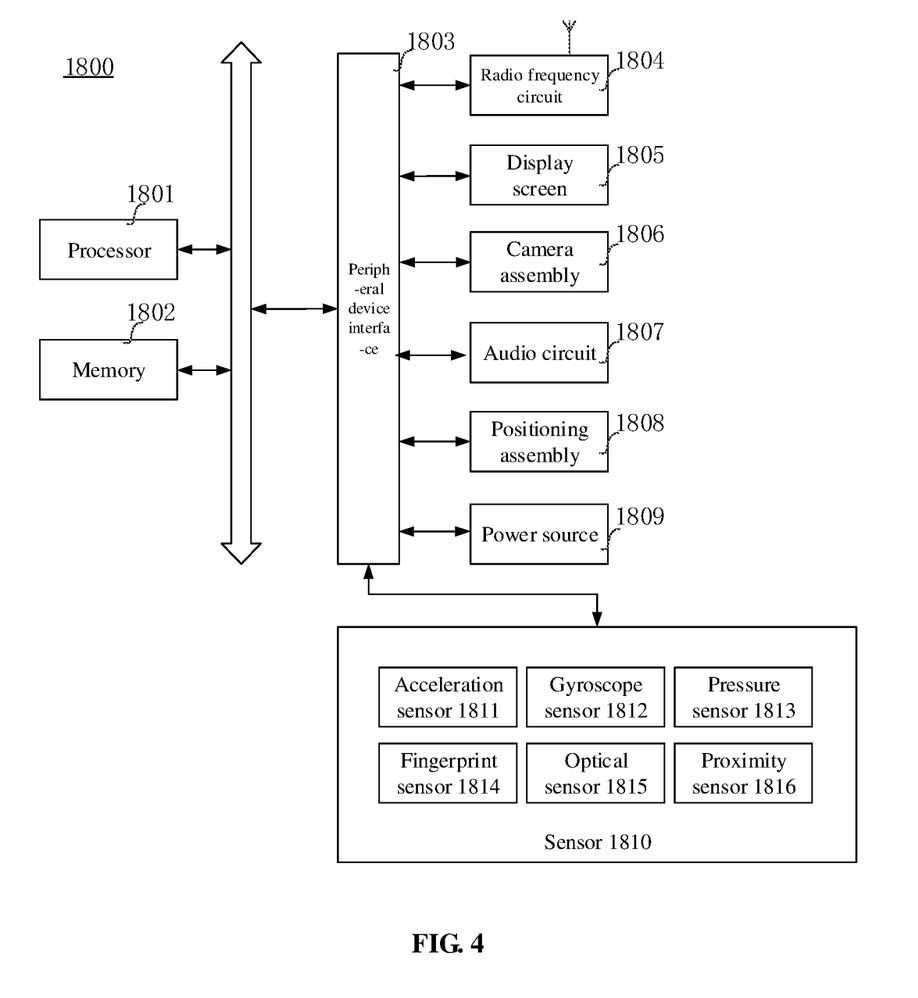
FIG. 4 is a schematic structural diagram of a terminal according to an exemplary embodiment of the present disclosure.

FIG. 4 is a schematic structural diagram of a computer device 1800 according to an exemplary embodiment of the present disclosure. The computer device 1800 may be implemented as a terminal. For example, the terminal may be a smart phone, a tablet computer, a Moving Picture Experts Group Audio Layer III (MP3) player, a Moving Picture Experts Group Audio Layer IV (MP4) player, a laptop computer or a desktop computer. The computer device 1800 may also be referred to as a user equipment, a portable computer device, a laptop computer device, a desktop computer device or the like. Alternatively, the computer device 1800 may also be implemented as a server.

Generally, the computer device 1800 includes a processor 1801 and a memory 1802.

The processor 1801 may include one or a plurality of processing cores, for example, a four-core processor, an eight-core processor or the like. The processor 1801 may be practiced based on a hardware form of at least one of digital signal processing (DSP), field-programmable gate array (FPGA), and programmable logic array (PLA). The processor 1801 may further include a primary processor and a secondary processor. The primary processor is a processor configured to process data in an active state, and is also referred to as a central processing unit (CPU); and the secondary processor is a low-power consumption processor configured to process data in a standby state. In some embodiments, the processor 1801 may be integrated with a graphics processing unit (GPU), wherein the GPU is configured to render and draw the content to be displayed on the screen. In some embodiments, the processor 1801 may further include an artificial intelligence (AI) processor, wherein the AI processor is configured to process calculate operations related to machine learning.

The memory 1802 may include one or a plurality of computer-readable storage media, wherein the computer-readable storage medium may be non-transitory. The memory 1802 may include a high-speed random access memory, and a non-transitory memory, for example, one or a plurality of magnetic disk storage devices or flash storage devices. In some embodiments, the non-transitory computer-readable storage medium in the memory 1802 may be configured to store at least one instruction, wherein the at least one instruction is executed by the processor 1801 to perform the method for searching an audio according to the embodiments of the present disclosure. For example, the at least one instruction is used to be executed by the processor 1801, to implement all or part of the steps in the method for searching an audio provided in the embodiments of the present disclosure.

In some embodiments, the computer device 1800 further optionally includes a peripheral device interface 1803 and at least one peripheral device. The processor 1801, the memory 1802 and the peripheral device interface 1803 may be connected to each other via a bus or a signal line. The at least one peripheral device may be connected to the peripheral device interface 1803 via a bus, a signal line or a circuit board. Specifically, the peripheral device includes at least one of a radio frequency circuit 1804, a touch display screen 1805, a camera 1806, an audio circuit 1807, a positioning assembly 1808 and a power source 1809.

The peripheral device interface 1803 may be configured to connect the at least one peripheral device related to input/output (I/O) to the processor 1801 and the memory 1802. In some embodiments, the processor 1801, the memory 1802 and the peripheral device interface 1803 are integrated on the same chip or circuit board. In some other embodiments, any one or two of the processor 1801, the memory 1802 and the peripheral device interface 1803 may be practiced on a separate chip or circuit board, which is not limited in this embodiment.

The radio frequency circuit 1804 is configured to receive and transmit a radio frequency (RF) signal, which is also referred to as an electromagnetic signal. The radio frequency circuit 1804 communicates with a communication network or another communication device via the electromagnetic signal. The radio frequency circuit 1804 converts an electrical signal to an electromagnetic signal and sends the signal, or converts a received electromagnetic signal to an electrical signal. Optionally, the radio frequency circuit 1804 includes an antenna system, an RF transceiver, one or a plurality of amplifiers, a tuner, an oscillator, a digital signal processor, a codec chip set, a subscriber identification module card or the like. The radio frequency circuit 1804 may communicate with another computer device based on at least one wireless communication protocol. The wireless communication protocol includes, but is not limited to: a metropolitan area network, generations of mobile communication networks (including 2G, 3G 4G and 5G), a wireless local area network and/or a wireless fidelity (WiFi) network. In some embodiments, the radio frequency circuit 1804 may further include a near field communication (NFC)-related circuit, which is not limited in the present disclosure.

The display screen 1805 is configured to display a user interface (UI). The UI may include graphics, texts, icons, videos and any combination thereof. When the display screen 1805 is a touch display screen, the display screen 1805 further has the capability of acquiring a touch signal on a surface of the display screen 1805 or above the surface of the display screen 805. The touch signal may be input to the processor 1801 as a control signal, and further processed therein. In this case, the display screen 1805 may be further configured to provide a virtual button and/or a virtual keyboard, which are also referred to as a soft button and/or a soft keyboard. In some embodiments, one display screen 1805 may be provided, which is arranged on a front panel of the computer device 1800. In some other embodiments, at least two display screens 1805 are provided, which are respectively arranged on different surfaces of the computer device 1800 or designed in a folded fashion. In still some other embodiments, the display screen 1805 may be a flexible display screen, which is arranged on a bent surface or a folded surface of the computer device 1800. Even, the display screen 1805 may be further arranged to an irregular pattern which is non-rectangular, that is, a specially-shaped screen. The display screen 1805 may be fabricated from such materials as a liquid crystal display (LCD), an organic light-emitting diode (OLED) and the like.

The camera assembly 1806 is configured to capture an image or a video. Optionally, the camera assembly 1806 includes a front camera and a rear camera. Generally, the front camera is arranged on a front panel of the computer device, and the rear camera is arranged on a rear panel of the computer device. In some embodiments, at least two rear cameras are arranged, which are respectively any one of a primary camera, a depth of field (DOF) camera, a wide-angle camera and a long-focus camera, such that the primary camera and the DOF camera are fused to implement the background virtualization function, and the primary camera and the wide-angle camera are fused to implement the panorama photographing and virtual reality (VR) photographing functions or other fused photographing functions. In some embodiments, the camera assembly 1806 may further include a flash. The flash may be a single-color temperature flash or a double-color temperature flash. The double-color temperature flash refers to a combination of a warm-light flash and a cold-light flash, which may be used for light compensation under different color temperatures.

The audio circuit 1807 may include a microphone and a speaker. The microphone is configured to capture an acoustic wave of a user and an environment, and convert the acoustic wave to an electrical signal and output the electrical signal to the processor 1801 for further processing, or output the electrical signal to the radio frequency circuit 1804 to implement voice communication. For the purpose of stereo capture or noise reduction, a plurality of microphones may be provided, which are respectively arranged at different positions of the computer device 1800. The microphone may also be an array microphone or an omnidirectional capturing microphone. The speaker is configured to convert an electrical signal from the processor 1801 or the radio frequency circuit 1804 to an acoustic wave. The speaker may be a traditional thin-film speaker, or may be a piezoelectric ceramic speaker. When the speaker is a piezoelectric ceramic speaker, it can not only convert an electrical signal to an acoustic wave audible by human beings, but also can convert an electrical signal to an acoustic wave inaudible by human beings for the purpose of ranging or the like. In some embodiments, the audio circuit 1807 may further include a headphone plug.

The positioning assembly 1808 is configured to determine a current geographical position of the computer device 1800 to implement navigation or a local based service (LBS). The positioning assembly 1808 may be based on the global positioning system (GPS) from the United States, the Beidou positioning system from China, or the Galileo satellite navigation system from the European Union.

The power source 1809 is configured to supply power for various components in the computer device 1800. The power source 1809 may be an alternating current, a direct current, a disposable battery or a rechargeable battery. When the power source 1809 includes a rechargeable battery, the rechargeable battery may be a wired rechargeable battery or a wireless rechargeable battery. The wired rechargeable battery is a battery charged through a wired line, and the wireless rechargeable battery is a battery charged through wireless coil. The rechargeable battery may also support the quick-charging technology.

In some embodiments, the computer device 1800 may further include one or a plurality of sensors 1810. The one or plurality of sensors 1810 include, but are not limited to: an acceleration sensor 1811, a gyroscope sensor 1812, a pressure sensor 1813, a fingerprint sensor 1814, an optical sensor 1815 and a proximity sensor 1816.

The acceleration sensor 1811 may detect accelerations on three coordinate axes in a coordinate system established for the computer device 1800. For example, the acceleration sensor 1811 may be configured to detect components of a gravity acceleration on the three coordinate axes. The processor 1801 may control the touch display screen 1805 to display the user interface in a horizontal view or a longitudinal view based on a gravity acceleration signal acquired by the acceleration sensor 1811. The acceleration sensor 1811 may be further configured to acquire motion data of a game or a user.

The gyroscope sensor 1812 may detect a direction and a rotation angle of the computer device 1800, and the gyroscope sensor 1812 may collaborate with the acceleration sensor 1811 to capture a 3D action performed by the user for the computer device 1800. Based on the data acquired by the gyroscope sensor 1812, the processor 1801 may implement the following functions: action sensing (for example, modifying the UI based on an inclination operation of the user), image stabilization during the photographing, game control and inertial navigation.

The pressure sensor 1813 may be arranged on a side frame of the computer device 1800 and/or on a lower layer of the touch display screen 1805. When the pressure sensor 1813 is arranged on the side frame of the computer device 1800, it can detect a grip signal of the user against the computer device 1800, and the processor 1801 implements left or right hand identification or perform a shortcut operation based on the grip signal acquired by the pressure sensor 1813. When the force sensor 1813 is arranged on the lower layer of the touch display screen 1805, the processor 1801 implement control of an operable control on the UI based on a pressure operation of the user against the touch display screen 1805. The operable control includes at least one of a button control, a scroll bar control, an icon control, and a menu control.

The fingerprint sensor 1814 is configured to acquire fingerprints of the user, and the processor 1801 determines the identity of the user based on the fingerprints acquired by the fingerprint sensor 1814, or the fingerprint sensor 1814 determines the identity of the user based on the acquired fingerprints. When it is determined that the identity of the user is trustable, the processor 1801 authorizes the user to perform related sensitive operations, wherein the sensitive operations include unlocking the screen, checking encrypted information, downloading software, paying and modifying settings and the like. The fingerprint sensor 1814 may be arranged on a front face, a back face or a side face of the computer device 1800. When the computer device 1800 is provided with a physical key or a manufacturer's logo, the fingerprint sensor 1814 may be integrated with the physical key or the manufacturer's logo.

The optical sensor 1815 is configured to acquire the intensity of ambient light. In one embodiment, the processor 1801 may control the display luminance of the touch display screen 1805 based on the intensity of ambient light acquired by the optical sensor 1815. Specifically, when the intensity of ambient light is high, the display luminance of the touch display screen 1805 is up-shifted; and when the intensity of ambient light is low, the display luminance of the touch display screen 1805 is down-shifted. In another embodiment, the processor 1801 may further dynamically adjust photographing parameters of the camera assembly 1806 based on the intensity of ambient light acquired by the optical sensor 1815.

The proximity sensor 1816, which is also referred to as a distance sensor, is generally arranged on the front panel of the computer device 1800. The proximity sensor 1816 is configured to acquire a distance between the user and the front face of the computer device 1800. In one embodiment, when the proximity sensor 1816 detects that the distance between the user and the front face of the computer device 1800 gradually decreases, the processor 1801 controls the touch display screen 1805 to switch from an active state to a rest state; and when the proximity sensor 1816 detects that the distance between the user and the front face of the computer device 1800 gradually increases, the processor 1801 controls the touch display screen 1805 to switch from the rest state to the active state.

A person skilled in the art may understand that the structure of the terminal as illustrated in FIG. 4 does not construe a limitation on the computer device 1800. The terminal may include more or less components than those illustrated in FIG. 4, or combinations of some components, or employ different component deployments.

Other embodiments of the present disclosure will be apparent to those skilled in the art from consideration of the specification and practice of the present disclosure. This disclosure is intended to cover any variations, uses, or adaptations of the present disclosure following the general principles thereof and including common knowledge or commonly used technical measures which are not disclosed herein. The specification and embodiments are to be considered as exemplary only, with a true scope and spirit of the present disclosure is indicated by the following claims.

The technical solutions according to the embodiments of the present disclosure may achieve the following beneficial effects:

With the method according to this embodiment, a predetermined trigger event is detected in response to receiving a trigger instruction for searching an audio; a time point when the trigger event occurs is recorded each time when the predetermined trigger event is detected, and recorded time points are acquired until a predetermined end event is detected to obtain a time point sequence; a target reference time sequence matching the time point sequence is selected from pre-stored reference time sequences, wherein the reference time sequence is a sequence formed of time information of a plurality of contiguous audio units in audio data; and target audio data corresponding to the target reference time sequence is determined based on a pre-stored corresponding relationship between audio data and the reference time sequence. In this way, a user may input a time point sequence reflecting audio change characteristics based on an operation mode (for example, tapping the screen of the mobile phone) corresponding to the predetermined trigger event, and search the corresponding audio data based on the time point sequence, such that the audio data may be searched without the title of the song.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A method for searching an audio, performed by a computer device comprising an application having a music play function, the method comprising:
   receiving, from the application, a trigger instruction for searching an audio;
   receiving, in response to the trigger instruction for searching the audio, trigger events via a search interface of the application;
   detecting a predetermined trigger event in the received trigger events, wherein the predetermined trigger event is input to the computer device based on content of the audio to be searched, wherein detecting the predetermined trigger event comprises acquiring a plurality of frames of images by an image capturing component of the computer device, and detecting an image of a predetermined user action in the plurality of frames of images;
   recording, each time a predetermined trigger event is detected, a time point when the detected predetermined trigger event occurs;
   acquiring, when a predetermined end event is detected, all recorded time points to obtain a time point sequence, wherein the time point sequence reflects audio change characteristics of the audio to be searched, the predetermined end event refers to that detection of the predetermined trigger event is stopped after a default detection time period, wherein the default detection time period is started upon receiving of the trigger instruction for searching the audio;

selecting a target reference time sequence matching the time point sequence from a plurality of reference time sequences stored in a database, wherein each of the reference time sequences is a sequence formed of time information of a plurality of contiguous audio units comprised in audio data of a song, the contiguous audio units are obtained by segmenting the audio data of the song, the time information comprises a start time point or a time duration of an audio unit and the reference time sequences stored in the database comprise time information of different types of audio units obtained by segmenting each song in different ways, the different types of audio units comprise an audio segment corresponding to one or more words in a lyric corresponding to the audio data;

determining, based on a stored corresponding relationship between audio data and the reference time sequences, target audio data corresponding to the target reference time sequence as selected, wherein the target audio data is audio data of the audio to be searched; and playing the target audio data by the application.

2. The method according to claim 1, wherein the selecting a target reference time sequence matching the time point sequence from the plurality of reference time sequences stored in the database comprises:

determining a difference degree between each stored reference time sequence and the time point sequence respectively, and selecting a reference time sequence which has a minimum difference degree from the time point sequence as the target reference time sequence.

3. The method according to claim 2, wherein the determining the difference degree between each stored reference time sequence and the time point sequence comprises:

calculating an edit distance between each stored reference time sequence and the time point sequence; and taking the edit distance between each stored reference time sequence and the time point sequence as the difference degree between each pre-stored reference time sequence and the time point sequence.

4. The method according to claim 1, wherein in a case that the time information comprises the time duration of the audio unit, the selecting the target reference time sequence matching the time point sequence from the plurality of reference time sequences stored in the database comprises:

determining, based on the time point sequence, a time difference between each two adjacent time points in the time point sequence to obtain a time difference sequence; and selecting the target reference time sequence matching the time different sequence from the stored reference time sequences.

5. A computer device including an application having a music play function, the computer device comprising:

a processor; and a memory storing instructions executable by the processor;

wherein the instructions, when executed by the processor, cause the processor to:

receive, from the application, a trigger instruction for searching the audio;

receive, in response to the trigger instruction for searching the audio, trigger events input via a search interface of the application;

detect a predetermined trigger event in the received trigger events, wherein the predetermined trigger event is input to the computer device based on content of the audio to be searched, wherein detecting the predetermined trigger event comprises acquiring a plurality of frames of images by an image capturing component of the computer device, and detecting an image of a predetermined user action in the plurality of frames of images;

record, each time a predetermined trigger event is detected, a time point when the detected predetermined trigger event occurs;

acquire, when a predetermined end event is detected, all recorded time points to obtain a time point sequence, wherein the time point sequence reflects audio change characteristics of the audio to be searched, the predetermined end event refers to that detection of the predetermined trigger event is stopped after a default detection time period, wherein the default detection time period is started upon receiving of the trigger instruction for searching the audio;

select a target reference time sequence matching the time point sequence from a plurality of reference time sequences stored in a database, wherein each of the reference time sequence is a sequence formed of time information of a plurality of contiguous audio units in audio data of a song, the contiguous audio units are obtained by segmenting the audio data of the song, the time information comprises a start time point or a time duration of an audio unit, and the reference time sequences stored in the database comprise time information of different types of audio units obtained by segmenting each song in different ways, the different types of audio units comprise an audio segment corresponding to one or more words in a lyric corresponding to the audio data;

determine, based on a stored corresponding relationship between audio data and the reference time sequences, target audio data corresponding to the target reference time sequence as selected, wherein the target audio data is audio data of the audio to be searched; and play the target audio data by the application.

6. The computer device according to claim 5, wherein the instructions, when executed by the processor, cause the processor, when selecting the target reference time sequence matching the time point sequence from the plurality of reference time sequences stored in the database, to:

determine a difference degree between each reference time sequence and the time point sequence respectively; and select a reference time sequence which has a minimum difference degree from the time point sequence as the target reference time sequence.

7. The computer device according to claim 6, wherein the instructions, when executed by the processor, cause the processor, when determining the difference degree between each stored reference time sequence and the time point sequence, to:

calculate an edit distance between each pre-stored reference time sequence and the time point sequence; and take the edit distance between each stored reference time sequence and the time point sequence as the difference degree between each stored reference time sequence and the time point sequence.

8. The computer device according to claim 5, wherein, when the time information comprises the time duration of the audio unit, the selecting the target reference time sequence matching the time point sequence from the plurality of reference time sequences stored in the database comprises:
  determining, based on the time point sequence, a time difference between each two adjacent time points in the time point sequence to obtain a time difference sequence; and
  selecting the target reference time sequence matching the time different sequence from the stored reference time sequences.

9. A non-transitory computer-readable storage medium, wherein the non-transitory computer-readable storage medium stores at least one instruction, at least one program, a code set or an instruction set, the at least one instruction, the at least one program, the code set or the instruction set being executed and loaded by a processor to perform the method for searching an audio according to claim 1.

10. The method according to claim 1, wherein the start time point of each audio unit comprises start time points of audio segments corresponding to each note of the audio unit, or a start time point of an audio segment corresponding to one or more words in a lyric corresponding to the audio data.

11. The method according to claim 1, wherein each of the reference time sequences stored in the database comprise time information of a plurality of contiguous audio units corresponding to a climactic or verse part of one song.

12. The method according to claim 2, wherein the determining the difference degree between each stored reference time sequence and the time point sequence respectively comprises:
  calculating a cross-correlation between each stored reference time sequence and the time point sequence by a cross-correlation function; and
  taking a cross-correlation between each stored reference time sequence and the time point sequence as a difference degree between each stored reference time sequence and the time point sequence.

13. The method according to claim 2, wherein the determining the difference degree between each stored reference time sequence and the time point sequence comprises:
  calculating a cross-correlation between each stored reference time sequence and the time point sequence by an Earth Mover's Distance (EMD) algorithm.

14. The method according to claim 3, wherein the edit distance between an $i^{th}$ reference time sequence and the time point sequence is as follows:

$$\text{distance}(\hat{X}, \hat{Y}_i) = \min(c[n][j]), 0 < j \le m$$

wherein $\hat{X}$ denotes the time point sequence, $\hat{Y}_i$ denotes the $i^{th}$ reference time sequence, n denotes the number of time differences included in $\hat{X}$, and m denotes the number of time differences included in $\hat{Y}_i$;

when i=0 or j=0, the following expression is tenable:

$$c[i][j]=0$$

when i>0 and j>0, the following expression is tenable:

$$c[i][j] = \min \begin{cases} c[i-1][j] + a \\ c[i-1][j-1] + \text{abs}(\hat{x}_i - \hat{y}_j) \\ c[i][j-1] + b \end{cases}$$

wherein, abs( ) denotes an absolute value operator, a and b denote weight constants, and c[i][j] denotes an edit distance matrix which is an n×m matrix.

15. The method according to claim 12, wherein a calculation formula of the cross-correlation function is as follows:

$$c(n) = \sum_j x(j) y(j-n), 0 < j \le \min(n, m)$$

wherein n denotes the number of time differences included in the time point sequence, and m denotes the number of time differences included in a currently calculated reference time sequence.

* * * * *